United States Patent [19]

Cabili

[11] Patent Number: 4,864,111
[45] Date of Patent: Sep. 5, 1989

[54] PROMISSORY NOTE

[76] Inventor: Semo Cabili, 244 Bnei Efraim Street, Tel Aviv, Israel

[21] Appl. No.: 35,451

[22] Filed: Apr. 7, 1987

[30] Foreign Application Priority Data

Apr. 8, 1986 [IL] Israel ................................ 78437

[51] Int. Cl.$^4$ ............................................. G06K 5/00
[52] U.S. Cl. ................................... 235/437; 235/456; 235/494; 283/58
[58] Field of Search ................ 235/456, 494, 437; 283/58

[56] References Cited

U.S. PATENT DOCUMENTS

| | | | |
|---|---|---|---|
| 748,766 | 1/1904 | Marshall | 283/58 |
| 4,300,123 | 11/1981 | McMillin et al. | 235/456 X |
| 4,667,985 | 5/1987 | Leonard et al. | 283/58 |

*Primary Examiner*—David L. Trafton
*Attorney, Agent, or Firm*—Marshall, O'Toole, Gerstein, Murray & Bicknell

[57] ABSTRACT

A numerical instrument comprising a first location array defining a plurality of digit location for entry of numerals to define a number amount and a second location array in the form of a grid having rows corresponding to numbers and columns corresponding to digit locations, whereby the grid may be filled in to correspond to the number amount indicated in the first location array.

10 Claims, 4 Drawing Sheets

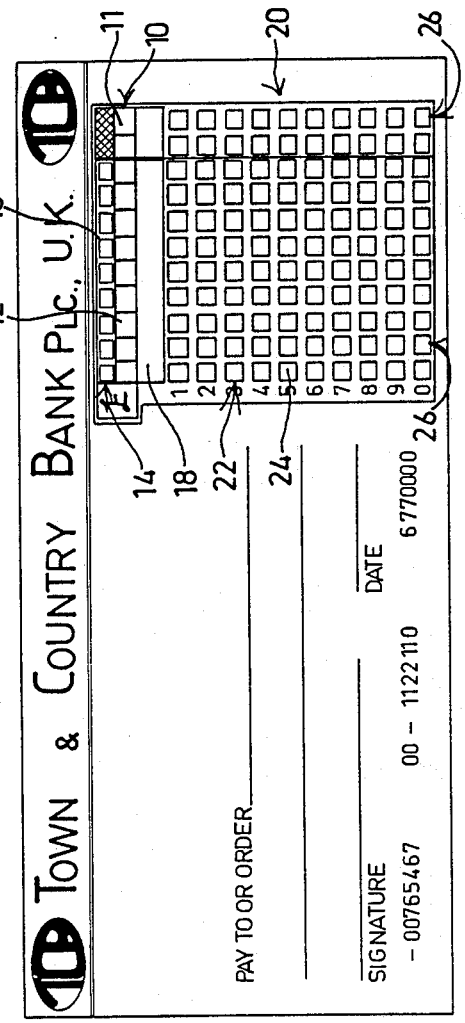
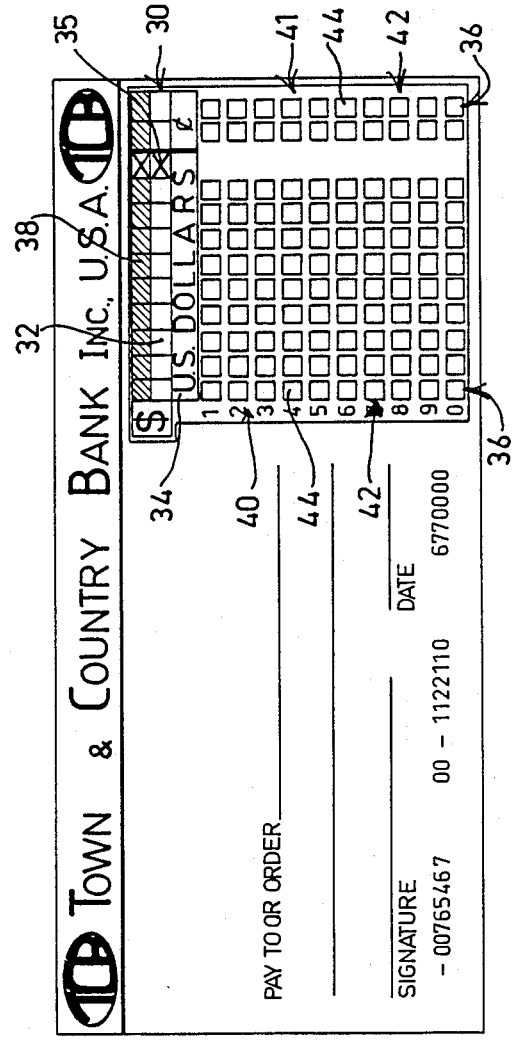

PROMISSORY NOTE

FIELD OF THE INVENTION

The present invention relates to numerical instruments, such as checks, vouchers, and the like, and more particularly to numerical instruments which are machine readable and apparatus for reading such numerical instruments.

BACKGROUND OF THE INVENTION

Conventional checks and vouchers, such as credit card vouchers, include locations in which amounts of money must be indicated both in numerical form and in words. Use of this format, which is intended to provide enhanced protection against mistakes, forgery, and alteration of the numerical instrument, involves a number of difficulties:

1. Writing out the amount of money in words is often difficult and time consuming for persons unfamiliar with the language of a given country, and this limits the convenience of such instruments to given countries or regions.

2. Comparison of the numerical and word forms of the amounts on a given numerical instrument requires relatively skilled and diligent employees at the controlling institution, such as a bank or credit card company. Such comparison is extremely time consuming and tiresome, resulting in the fact that not all instruments are in fact checked for agreement between the numerical and word forms of the amounts indicated thereon.

3. The word forms of the amounts are not currently machine readable. In most cases, the numerical form of the amounts is also not machine readable.

SUMMARY OF THE INVENTION

The present invention seeks to provide a form of numerical instrument that is universal in its application, can be used easily and rapidly, and is machine readable.

The present invention, as hereinbelow described, is adaptable to a plurality of functions, for example, the stock control of items of value and items where accuracy is of paramount importance, typically items such as tax forms. The preferred embodiments described hereinbelow, however, deal entirely with functions concerning financial transactions.

There is thus provided in accordance with a preferred embodiment of the present invention a numerical instrument comprising a first location array defining a plurality of digit locations for entry of numerals to define a number amount and a second location array in the form of a grid having rows corresponding to numbers and columns corresponding to digit locations, whereby the grid may be filled in to correspond to the number amount indicated in the first location array.

For the purposes of the present specification and claims, the terms row and column are used interchangeably, thus rows may refer to either a horizontal or vertical arrangement of spaces, and columns refer to the arrangement perpendicular thereto, such that if rows is used to refer to a vertical arrangement, then columns refers to a horizontal arrangement.

Further in accordance with an embodiment of the invention, the numerical instrument described above is formed with a number of columns corresponding to a number of digit locations and a number of rows corresponding to the number of single digit integers.

Additionally in accordance with an embodiment of the invention, there is provided a method of effecting financial transactions comprising the steps of:

providing a numerical instrument comprising a first location array defining a plurality of digit locations for entry of numerals to define a number amount and a second location array in the form of a grid having rows corresponding to numbers and columns corresponding to digit locations, whereby the grid may be filled in to correspond to the number amount indicated in the first location array;

filling in the first location array with numbers corresponding to a desired amount; and filling in the second location array with indications of the desired amount and corresponding to the numbers filled in in the first location array.

Additionally in accordance with a preferred embodiment of the present invention, the method also includes the step of confirming the accuracy and authenticity of the filled-in numerical instrument by:

firstly, machine reading the second location array;

secondly, machine printing in arabic numerals in a space preselected but preferably adjacent to the first location array, the number corresponding to that amount read in the second location array; and thirdly, comparing the amounts indicated in the first location array and in the preselected space; this function being performed either manually or by machine.

In a preferred embodiment of the present invention, the above-mentioned steps of machine reading and machine printing are carried out using apparatus comprising a video camera in combination with a computer and printer and using appropriate software.

In another preferred embodiment of the present invention the step of comparing is carried out by computerized means, largely as described hereinabove, but including additional software to "read" arabic numerals.

An additional preferred embodiment of the present invention is that of a numerical instrument comprising a first location array defining a plurality of digit locations for entry of numerals to define a number amount and second and third location arrays in the form of two grids having rows corresponding to numbers and columns to digit locations of whole units of a particular currency and hundredths of that currency respectively, whereby the grid may be filled in to correspond to the number amount indicated in the first location array.

Further in accordance with an embodiment of the invention, the monetary instrument described above is formed with a number of columns corresponding to the number of digit locations and a number of rows corresponding to the set of single digit integers.

Additionally in accordance with an embodiment of the invention, there is provided a method of effecting financial transactions comprising the steps of:

providing a numerical instrument comprising a first location array defining a plurality of digit locations for entry of numerals to define a number amount comprising whole units and hundredths, and second and third locations arrays in the form of two grids, each having rows corresponding to numbers and columns corresponding to the digit locations of the units and hundredths respectively, whereby the grids may be filled in to correspond to the number amount indicated in the first location array;

filling in the first location array with numbers corresponding to a desired amount; and filling in the second and third location arrays with indications of the desired amounts and corresponding to the numbers filled in the first location array.

Additionally in accordance with a preferred embodiment of the present invention, the method also includes the step of confirming the accuracy of the filled-in financial instrument by:

firstly, machine reading the second and third location arrays;

secondly, machine printing in arabic numerals in a space preselected, but preferably adjacent to the first location array, the number corresponding to that amount read in the second and third location arrays; and thirdly, comparing the amounts indicated in the first location array and in the preselected space, this function being performed either manually or by machine.

In a preferred embodiment of the present invention, the above-mentioned steps of machine reading and machine printing are carried out using apparatus comprising a video camera in combination with a computer and printer and using appropriate software.

In another preferred embodiment of the present invention the step of comparing is carried out by computerized means, largely as described hereinabove, but including additional software to "read" arabic numerals.

BRIEF DESCRIPTION OF THE DRAWINGS

The present invention will be understood and appreciated more fully from the following detailed description taken in conjunction with the drawings wherein:

FIG. 1A is a pictorial illustration of a blank check constructed and operative in accordance with a first preferred embodiment of the present invention;

FIG. 2A is a pictorial illustration of a blank check constructed and operative in accordance with a second preferred embodiment of the present invention;

FIG. 3A is a pictorial illustration of a blank credit card voucher constructed and operative in accordance with a preferred embodiment of the present invention;

FIG. 3B is a pictorial illustration of a filled in credit card voucher constructed and operative in accordance with a preferred embodiment of the present invention.

DETAILED DESCRIPTION OF THE INVENTION

Figure 1B:
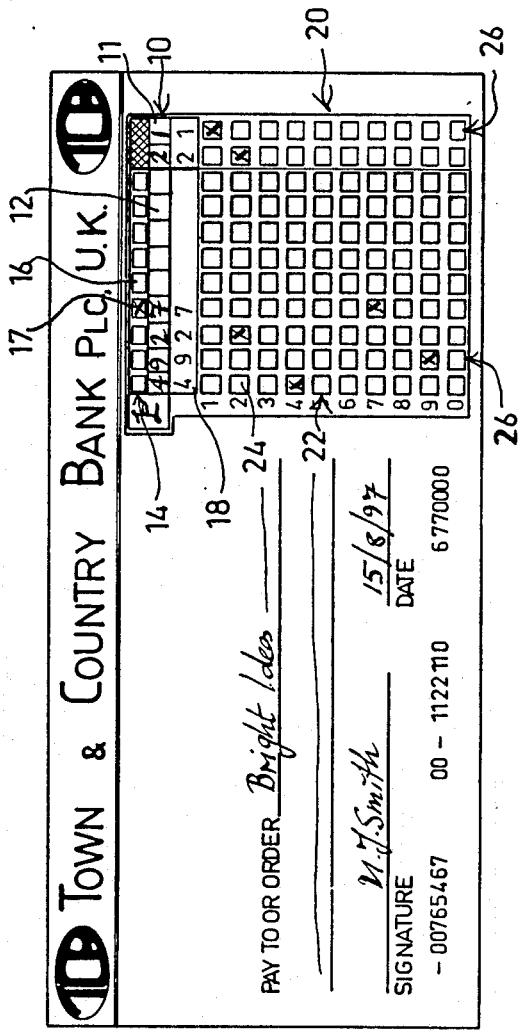
FIG. 1B is a pictorial illustration of a filled in check constructed and operative in accordance with a first preferred embodiment of the present invention.

Referring now to FIGS. 1A and 1B, there is shown a numerical instrument constructed and operative in accordance with an embodiment of the present invention. Reference is now made to FIGS. 1A and 1B, which illustrate a blank check and a filled-in check respectively, formed and used in accordance with a first preferred embodiment of the invention. The check contains typically along the top side thereof a printed identification of the bank and therebelow spaces for insertion of the name of the payee, the date of the check, and the signature. The identification of the account and bank in magnetic ink may appear at the lower left hand corner of the check in accordance with conventional practice.

In accordance with a preferred embodiment of the invention, there is provided at the right hand side of the check, typically, a row 10 of spaces 12 for insertion of numbers corresponding to unit parts of a currency and wherein there are additionally provided two spaces 11 for insertion of numbers corresponding to hundredth parts of a currency.

Above the spaces 12 of row 10, there is provided a row 14 of spaces 16, each of which preferably is located directly above a space 12. Immediately below row 10 there is provided a space 18, the function of which will be described hereinbelow with regard to the use of the present invention.

Below row 10 and preferably in registration therewith is a grid 20, typically having ten rows 22 of spaces 24, each row corresponding to an integer digit from 0 to 9. Each row 22 contains a plurality of spaces 24 which typically corresponds to the number of spaces 11 and 12 in row 10.

It may thus be appreciated that if row 10 is formed with typically nine spaces 12 and two spaces 11, as illustrated in FIGS. 1A and 1B, then eleven columns 26 are formed in grid 20, each column preferably underlying a space 12 or 11.

The use of the check will now be described with particular reference to FIG. 1B, which illustrates the check of FIG. 1A, fully filled out. As is seen in FIG. 1B, an amount, shown here by way of example as $4927.21, is indicated in arabic numerals in the spaces 12 of row 10, and the same amount is indicated in grid form in grid 20.

It is a particular feature of the present invention that in addition to the above described indications, an indication in preselected form 17, is made in one of the spaces 16, corresponding to the unitary digit filled out in row 10.

An additional feature of the present invention is that the indication of the amount in grid form may be machine read by conventional machinery. Where this is the case, a number in arabic numerals corresponding to the number indicated in grid 20, is printed in space 18 in registration with the handwritten number. Correspondance of the two numbers thus may be checked either manually or by machine. The printing in space 18 may be in machine readable numbers, similar to those printed elsewhere on the check, using magnetic ink or any other suitable technique.

According to a preferred embodiment of the invention, rows 10, 16 and 18 may be located below grid 20 instead of thereabove, so as to lie generally in line with the conventional machine readable numbers printed on the check along the bottom thereof.

It is therefore a particular feature of the present invention that the amount of the check need not be handwritten in word form, since comparison of the grid form in grid 20 and the arabic number in row 10 provides the necessary cross check of the accurracy of the amount.

Figure 2B:
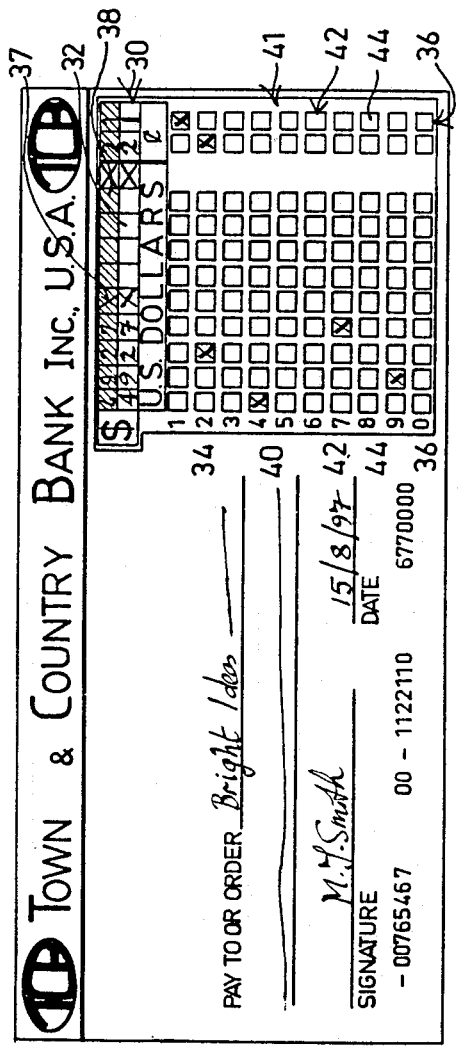
FIG. 2B is a pictorial illustration of a filled in check constructed and operative in accordance with a second preferred embodiment of the present invention.

Reference is now made to FIGS. 2A and 2B, which illustrate a blank check and a filled in check respectively, formed and used in accordance with a second preferred embodiment of the invention. The check contains typically along the top side thereof a printed identification of the bank and therebelow spaces for insertion of the name of the payee, the date of the check, and the signature. The identification of the account and bank in magnetic ink may appear at the lower left hand corner of the check in accordance with conventional practice.

In accordance with a preferred embodiment of the invention, there is provided at the right hand side of the check, typically, a row 30 of spaces 32 for insertion of numbers, corresponding to the amount of the check.

Immediately above row 30 there are provided spaces 38 the function of which will be described hereinbelow with regard to the use of the present invention. There is also provided a space 34, preferably below row 30, for preselected indication of the currency in operation.

Below row 30 and preferably in registration therewith are grids 40 and 41, each typically having ten rows 42 of spaces 44, each row corresponding to an integer digit from 0 to 9. Each row 42 contains a plurality of spaces 44 which typically corresponds to one less than the number of spaces 32 in row 30.

It may thus be appreciated that if row 30 is formed with typically twelve spaces 32, as illustrated in FIGS. 2A and 2B, then a total of eleven columns 36 are formed in grids 40 and 41, each column preferably underlying a space 32.

It may also be appreciated that columns 36 in grid 41 must always be two in number and that grid 40 comprises the remainder.

The use of the check will now be described with particular reference to FIG. 2B, which illustrates the check of FIG. 2A fully filled out. As is seen in FIG. 2B, an amount, typically $4927.21, is indicated in arabic numerals in the spaces 32 of row 30, and the same amount is indicated in grid form in grids 40 and 41.

It is a particular feature of the present invention that, in addition to the above described indications, an indication in preselected form 37 is made in one of the spaces 32 in row 30, immediately following the unitary digit filled out in that row.

It is an important feature of this particular embodiment of the present invention, that in the event of all of the available spaces 32 being filled in, there is already printed on the check an indication 35, such that machine processing of the check will not be adversely affected.

An additional feature of the present invention is that the indication of the amount in grid form may be machine read by conventional machinery. Where this is the case, corresponding to the number indicated in grids 40 and 41, a number is printed in space 38 in arabic numerals in registration with the handwritten number. Correspondance of the two numbers is hence checkable, either manually or by machine.

It is therefore a particular feature of the present invention that the amount of the check need not be handwritten in word form, since comparison of the grid form in grids 40 and 41 with the arabic number provides the necessary cross check of accuracy of the amount.

Figures 3A, 3B:
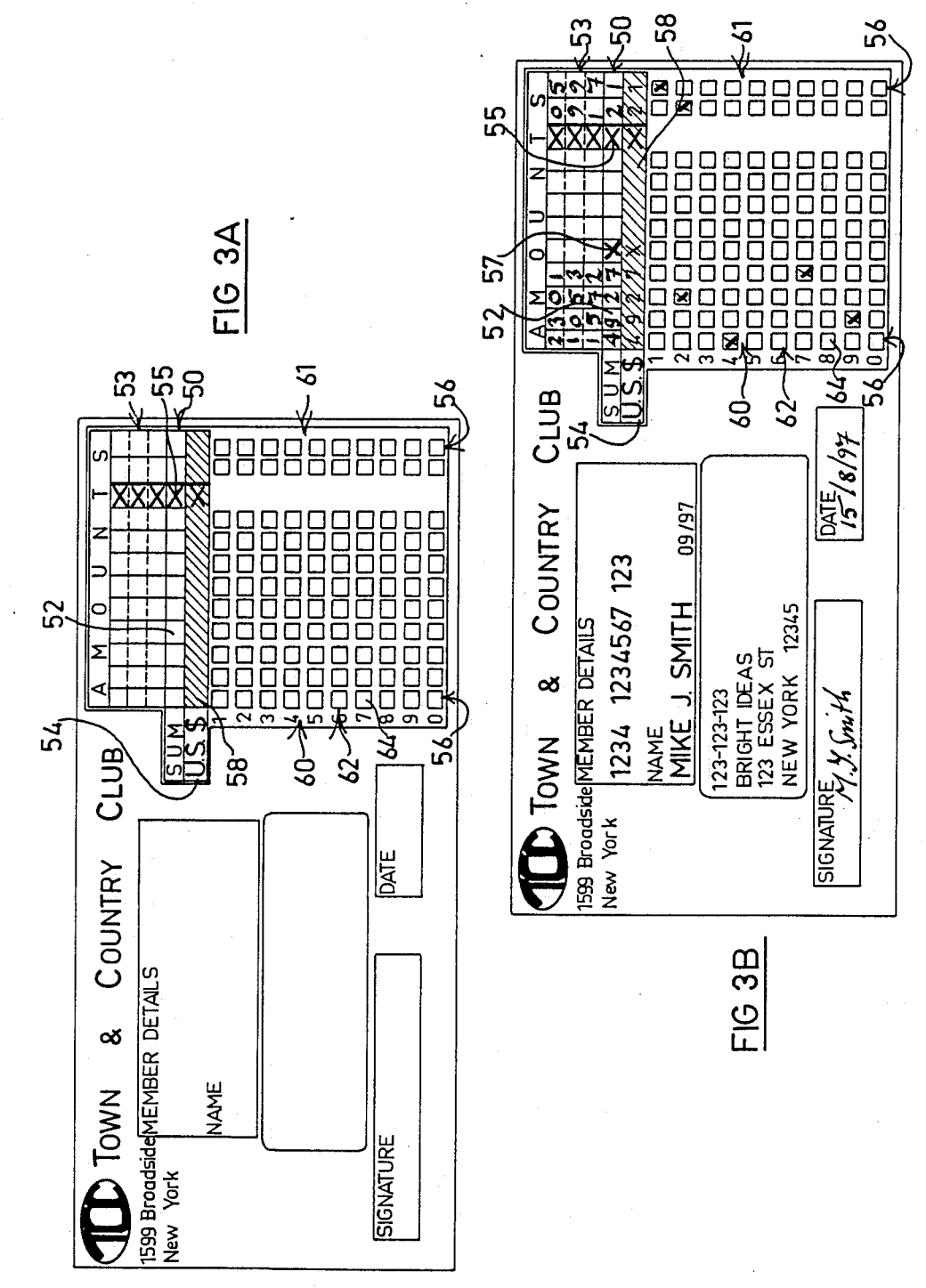

Reference is now made to FIGS. 3A and 3B, which illustrate a blank credit card voucher and a filled in credit card voucher respectively, formed and used in accordance with a preferred embodiment of the invention. The voucher contains typically at the left hand side thereof a printed identification of the merchant and therebelow respectively, spaces for insertion of the name of the payee and the date of the check and the signature. The identification of the merchant's bank account in magnetic ink may appear at the lower left hand corner of the voucher in accordance with conventional practice.

In accordance with a preferred embodiment of the invention, there is provided at the right hand side of the voucher, typically, a row 50 of spaces 52 for insertion of numbers, corresponding to the total amount of the voucher. Immediately above row 50 there is provided a plurality of rows 53 for amounts corresponding to the individual items of which the total amount is comprised.

Immediately below row 50 there is provided a space 58, the function of which will be described with regard to the use of the present invention. There is also provided a space 54, preferably immediately adjacent to the innermost side of row 50, for preselected indication of the currency in operation.

Below row 50 and space 58 and preferably in registration therewith are grids 60 and 61, each typically having ten rows 62 of spaces 64, each row corresponding to an integer digit from 0 to 9. Each row 62 contains a plurality of spaces 64 which typically corresponds to one less than the number of spaces 52 in row 50.

It may thus be appreciated that if row 50 is formed with typically twelve spaces 52, as illustrated in FIGS. 3A and 3B, then a total of eleven columns 56 are formed in grids 60 and 61, each column preferably underlying a space 52.

It may also be appreciated that columns 56 in grid 61 must always be two in number and that grid 60 comprises the remainder.

The use of the voucher will now be described with particular reference to FIG. 3B, which illustrates the voucher of FIG. 3A, fully filled out. As is seen in FIG. 3B, several amounts, which together comprise the total amount, are indicated in the plurality of rows 53. The total amount, typically $4927.21, is indicated in arabic numerals in the spaces 52 of row 50, and the same amount is indicated in grid form in grids 60 and 61.

It is a particular feature of the present invention that in addition to the above-described indications, an indication in preselected form 57, is made in one of the spaces 52 in row 50, immediately following the unitary digit filled out in that row.

It is an important feature of this particular embodiment of the present invention that in the event of all available spaces 52 being filled in, there is already printed on the voucher an indication 55, such that the machine processing of the check will not be adversely affected.

An additional feature of the present invention is that the indication of the amount in grid form may be machine read by conventional machinery. Where this is the case a number, corresponding to the number indicated in grids 60 and 61, is printed in space 58 in arabic numerals in registration with the handwritten number. Correspondance of the two numbers is hence checkable, either manually or by machine.

It is therefore a particular feature of the present invention that the amount of the voucher need not be handwritten in word form, since comparison of the grid form in grids 60 and 61 with the arabic number provides the necessary cross check of accuracy of the amount.

Figure 4:
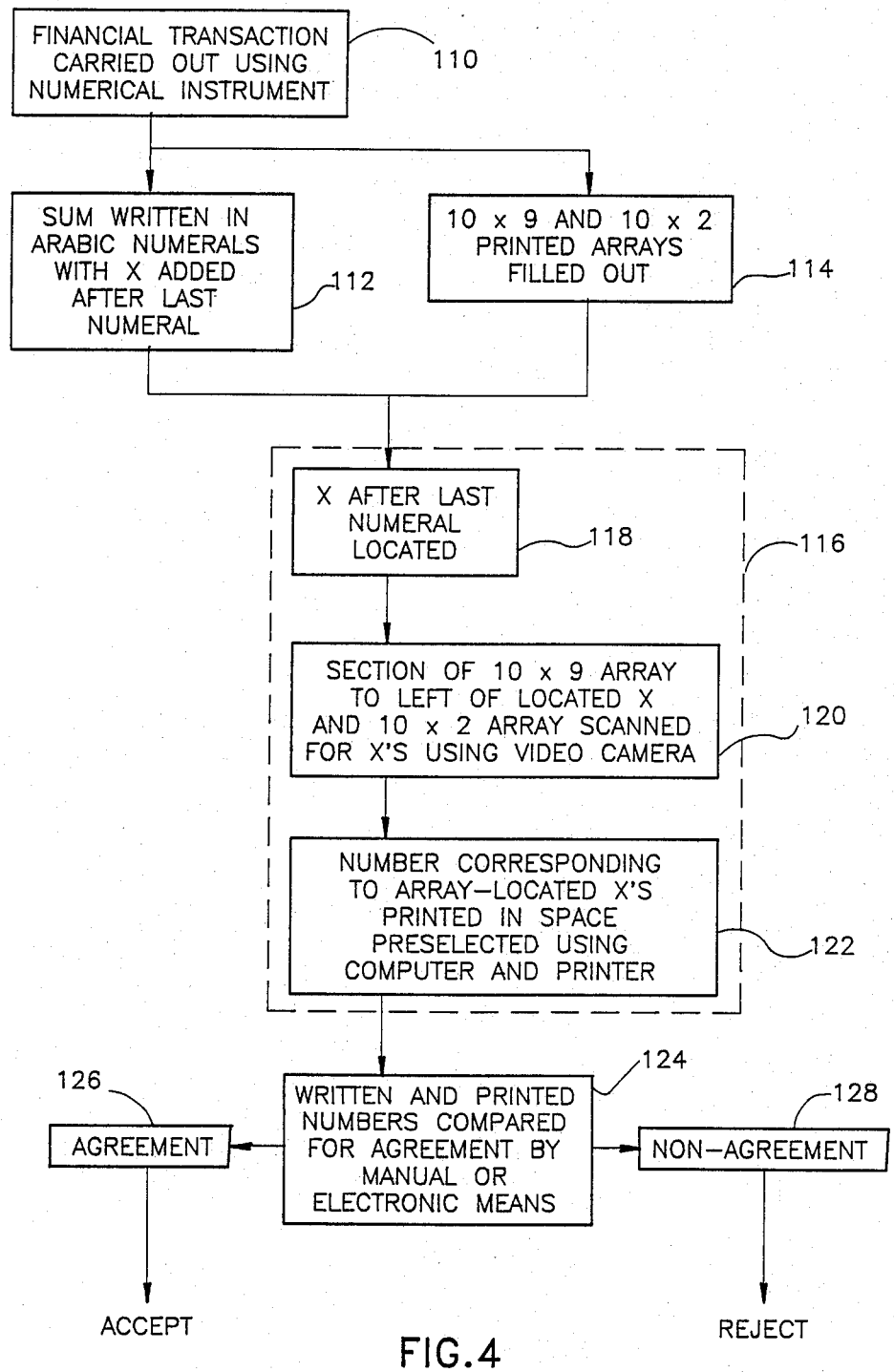
FIG. 4 is a block diagram illustration of the operation of verifying the accuracy of monetary instruments in accordance with a preferred embodiment of the invention.

There is shown in FIG. 4 a block diagram illustration of the operation of verifying the accuracy of monetary instruments in accordance with a preferred embodiment of the present invention described hereinabove with respect to FIGS. 2A, 2B, 3A and 3B. The operation of the preferred embodiment of the present invention described in FIGS. 1A and 1B is substantially the same as the operation hereinbelow described in reference to FIGS. 2A, 2B, 3A, and 3B, with one exception noted hereinbelow.

Boxes 110, 112 and 114 represent the completion of a financial transaction wherein a preferred embodiment of the present invention has been used as a medium of payment for goods, and wherein sum written in arabic numerals as indicated 112 refers to a sum written in spaces 52 of row 50 (FIGS. 3A and 3B) and the two arrays as indicated 114 refer to grids 60 and 61 (FIGS. 3A and 3B).

Indicated as 116 is a series of computerized steps through which the monetary instrument used in the financial transaction is passed in order to verify its accuracy whereby:

indication in preselected form 57 (FIG. 3B), which immediately follows the number on the monetary instrument written in arabic, is located as indicated by reference numeral 118;

that section of grid 60 (FIG. 3B) to the left of located indication in preselected form 57 (FIG. 3B) and all of grid 61 (FIG. 3B) are scanned for indications written therein and all such indications are located, as shown by reference numeral 120;

in the case of the preferred embodiment described in FIGS. 1A and 1B, indication in preselected form 17 (FIG. 1B), which is located directly above and in vertical registration with the last whole unit digit written on the monetary form in arabic, is located as indicated by reference numeral 118;

in the case of the preferred embodiment described in FIGS. 1A and 1B, scanning encompasses the column in vertical registration with the located indication in preselected form 17 and the section of grid 20 (FIG. 1B) to the left of this vertical column as well as the two vertical columns in grid 20 being in vertical registration with spaces 11.

the number corresponding to the indications as located in step 120 is automatically printed in space 58 (FIG. 3B), as shown by reference numeral 122.

It is important to point out that the above-mentioned steps of location of indications and of printing out a number corresponding to those indications may be carried out using apparatus comprising a video camera in combination with a computer and printer, such as typically a CDS-100 Camera Kit as provided by Chorus Data Systems, New Hampshire, and an IBM-XT micro computer together with a compatible printer and software as provided by Chorus Data Systems.

Once the above-mentioned steps have been carried out there remains, as indicated by reference numeral 124, the task of comparing the number originally written on the monetary instrument in arabic numerals with that number corresponding to the grid-indicated number as subsequently printed out.

The comparison may either be carried out manually, or by computerized means, as similarly described hereinabove, the only difference being that the software provided would additionally include a facility to "read" arabic numerals.

Finally, if the two numbers were found to correspond, thus confirming the accuracy thereof, as indicated 126, then the financial transaction would be confirmed. In such a case, the relevant data read from the monetary instrument will be recorded in an appropriate computer memory.

If, however, the two numbers were found not to correspond, as indicated 128, the monetary instrument would be rejected and could not be further used in relation to the financial transaction.

It will be appreciated by persons skilled in the art that the invention is not limited by what has been particularly shown and described hereinabove. Rather the scope of the present invention is defined only by the claims which follow:

What is claimed is:

1. A method of effecting financial transactions comprising the steps of:

providing a numerical instrument comprising a first location array defining a plurality of digit locations for entry of numerals to define a number amount and a second location array in the form of a grid having rows corresponding to numbers and columns corresponding to digit locations, whereby said grid may be filled in to correspond to said number amount indicated in said first location array;

filling in said first location array with numbers corresponding to a desired amount;

filling in said second location array with indications of said desired amount and corresponding to said numbers filled in said first location array; and confirming the accuracy and authenticity of said filled-in numerical instrument by:

firstly, machine reading said second location array;

secondly, machine printing in arabic numerals in a space preselected but preferably adjacent to said first location array, the number corresponding to that amount read in said second location array; and thirdly, comparing said amounts indicated in said first location array and in said preselected space.

2. A method according to claim 1 wherein said steps of machine reading and machine printing are carried out using apparatus comprising a video camera in combination with a computer and printer and in conjunction with appropriate software.

3. A method according to claim 1 wherein said step of comparing is carried out by manual means.

4. A method according to claim 1 wherein said step of comparing is carried out by machine.

5. A method according to claim 1 wherein said step of machine comparing is carried out using apparatus comprising a video camera in combination with a computer and printer and in conjunction with appropriate software.

6. A method of effecting financial transactions comprising the steps of:

providing a numerical instrument comprising a first location array defining a plurality of digit locations for entry of numerals to define a number amount and a second and third location arrays in the form of grids having rows corresponding to numbers and columns corresponding to digit locations, whereby said grids may be filled in to correspond to said number amount indicated in said first location array;

filling in said first location array with numbers corresponding to a desired amount;

filling in said second and third location arrays with indications of said desired amount and corresponding to said numbers filled in said first location array; and confirming the accuracy and authenticity of said filled-in numerical instrument by:

firstly, machine reading said second and third location arrays;

secondly, machine printing in arabic numerals in a space preselected but preferably adjacent to said first location array, the number corresponding to that amount read in said second and third location arrays; and thirdly, comparing said amounts indicated in said first location array and in said preselected space.

7. A method according to claim 6 wherein said steps of machine reading and machine printing are carried out using apparatus comprising a video camera in combination with a computer and printer and in conjunction with appropriate software.

8. A method according to claim 6 wherein said step of comparing is carried out by manual means.

9. A method according to claim 6 wherein said step of comparing is carried out by machine.

10. A method according to claim 6 wherein said step of machine comparing is carried out using apparatus comprising a video camera in combination with a computer and printer and in conjunction with appropriate software.

* * * * *